No. 800,239. PATENTED SEPT. 26, 1905.
G. B. PAUL.
HORSESHOE.
APPLICATION FILED FEB. 14, 1905.
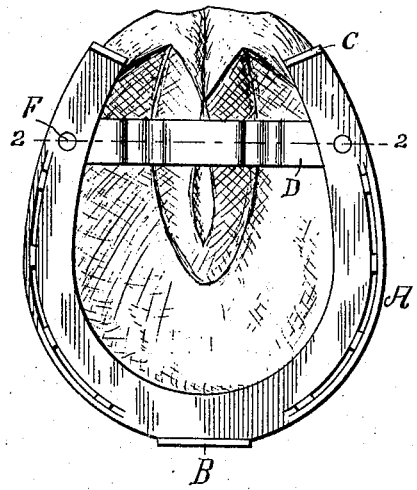
Fig. 1.
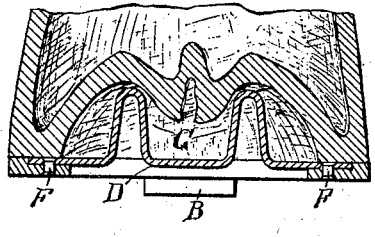
Fig. 4.
Fig. 2.
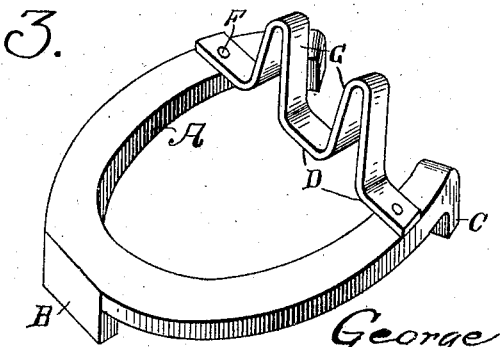
Fig. 3.
Witnesses
J. H. Burger
M. E. Moore
Inventor
George B. Paul,
By Wm. N. Moore
Attorney

UNITED STATES PATENT OFFICE.

GEORGE B. PAUL, OF CLINTON, MISSOURI.

HORSESHOE.

No. 800,239.      Specification of Letters Patent.      Patented Sept. 26, 1905.

Application filed February 14, 1905. Serial No. 245,573.

*To all whom it may concern:*

Be it known that I, GEORGE B. PAUL, a citizen of the United States, residing at Clinton, in the county of Henry and State of Missouri, have invented certain new and useful Improvements in Horseshoes, of which the following is a specification.

My invention relates to improvements in horseshoes; and the main object of my invention is the provision of a horseshoe particularly adapted to prevent contraction of the hoofs or other diseases and which will be of simple, inexpensive, and durable construction and thoroughly efficient for the purpose intended.

With this object in view my invention consists of a horseshoe embodying novel features of construction and combination of parts, substantially as disclosed herein.

Figure 1 represents a bottom plan view of my horseshoe applied to the hoof. Fig. 2 represents a vertical transverse sectional view. Fig. 3 represents a perspective view; and Fig. 4 represents an enlarged detail sectional view, showing the dovetail socket connection for the ends of the connecting-bar.

Referring by letter to the drawings, the letter A designates the shoe proper, which is provided with the toe-calk B and the heel-calk C, and adjacent the heel-calk and on the upper side is applied the transverse elastic or spring steel bar D, being connected by a dovetailed socket connection E or by means of a bolt-fastening F. This connecting-bar is formed with the upwardly-extending pair of spring-arms G, which fit snugly within the frog of the foot and serve to prevent contraction of the hoof, as is evident.

It will be understood that my connecting-bar can be applied to the shoe when first manufactured or may be used upon any shoe on the market and can be attached with ease and despatch by any blacksmith at a very small cost.

I claim—

1. The combination with a horseshoe, of a cross-bar connected thereto at each end, a bolt passing through each of said ends, said cross-bar having upwardly-extending portions to embrace the frog of the hoof.

2. The combination with a horseshoe, of an elastic cross-bar connected thereto near the heel portions by mortise-and-tenon joints, said cross-bar formed with upwardly-extending converging bends to form a brace for the frog of the hoof.

3. The combination with a horseshoe, of an elastic spring-bar having dovetail connections with and extending transversely across said shoe and formed with upright spring bends to inclose the frog of the hoof.

In testimony whereof I affix my signature in presence of two witnesses.

GEORGE B. PAUL.

Witnesses:
     ELLIS SMITH,
     W. G. WATKINS.